United States Patent [19]

Sabourin et al.

[11] Patent Number: 5,987,414
[45] Date of Patent: Nov. 16, 1999

[54] METHOD AND APPARATUS FOR SELECTING A VOCABULARY SUB-SET FROM A SPEECH RECOGNITION DICTIONARY FOR USE IN REAL TIME AUTOMATED DIRECTORY ASSISTANCE

[75] Inventors: Michael George Sabourin, St. Lambert, Canada; Jeff Marcus, Newton, Mass.

[73] Assignee: Nortel Networks Corporation, Montreal, Canada

[21] Appl. No.: 08/741,719

[22] Filed: Oct. 31, 1996

[51] Int. Cl.⁶ .................................................. G10L 5/00
[52] U.S. Cl. ........................ 704/270; 704/275; 704/245
[58] Field of Search .................................. 704/270, 275, 704/277, 255–257, 243–245; 379/88

[56] References Cited

U.S. PATENT DOCUMENTS

| | | | |
|---|---|---|---|
| 4,164,025 | 8/1979 | Dubnowski et al. | 364/900 |
| 4,751,736 | 6/1988 | Gupta et al. | 704/230 |
| 4,751,737 | 6/1988 | Gerson et al. | 704/243 |
| 4,797,910 | 1/1989 | Daudelin | 379/67 |
| 4,956,865 | 9/1990 | Lennig et al. | 704/241 |
| 4,959,855 | 9/1990 | Daudelin | 379/213 |
| 4,979,206 | 12/1990 | Padden et al. | 379/67 |
| 5,050,215 | 9/1991 | Nishimura | 704/256 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 704/246 |
| 5,097,509 | 3/1992 | Lennig | 704/240 |
| 5,127,055 | 6/1992 | Larkey | 704/244 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,226,044 | 7/1993 | Gupta et al. | 370/81 |
| 5,274,695 | 12/1993 | Green | 379/88 |
| 5,307,444 | 4/1994 | Tsuboka | 395/22 |
| 5,390,278 | 2/1995 | Gupta et al. | 704/243 |
| 5,488,652 | 1/1996 | Bielby et al. | 379/88 |
| 5,515,475 | 5/1996 | Gupta et al. | 704/242 |
| 5,621,859 | 4/1997 | Schwartz et al. | 704/257 |
| 5,651,095 | 7/1997 | Ogden | 704/257 |
| 5,758,319 | 5/1998 | Knittle | 704/257 |

OTHER PUBLICATIONS

Y. Gao et al., "Dynamic Adaptation of Hidden Markov Model for Robust Speech Recognition", IEEE International Syposium on Circuits and Systems, vol. 2, May (1989), pp. 1336–1339.

Lennig et al., "Flexible Vocabulary Recognition Of Speech Over The Telephone", Bell–Northern Research and INRS–Telecommunications, pp. 1–3, (1992).

Lennig et al., "Automated Bilingual Directory Assistance Trial In Bell Canada", Bell–Northern Research, pp. 1–4, IEEE Workshop on Interactive Voice Technology for Telecommunications Applications, Oct. 18–20, 1992.

Lennig, "Putting Speech Recognition to Work in the Telephone Network", Bell–Northern Research and INRS–Telecommunications, pp. 35–41, Aug. 1990.

Gorin et al., "Adaptive acquisition of language", Computer Speech and Language, vol. 5, pp. 101–132, 1991.

Rabiner, L. R. and B. H. Juang, "An Introduction to Hidden Markov Models",*IEEE ASSP Magazine,* (Jan. 1986), pp. 4–16.

(List continued on next page.)

*Primary Examiner*—David D. Knepper
*Attorney, Agent, or Firm*—Foley & Lardner

[57] ABSTRACT

A vocabulary sub-set is selected from a large speech recognition dictionary. The selected vocabulary sub-set may be used in a real time directory assistance system to improve the system's real-time performance. The selection process is effected on the basis of the cost-benefit ratio, the benefit being measured in savings in operator working time. On the other hand, the cost is measured in terms of hardware limitations, namely processor throughput. Typically, the vocabulary sub-set is limited to a maximum number orthographies that would enable the system to achieve real-time performance.

34 Claims, 5 Drawing Sheets

OTHER PUBLICATIONS

Bakis, R. and A. G. Cole, "Dynamic Modification of the Vocabulary of a Speech Recognition Machine",*IBM Technical Disclosure Bulletin,* vol. 27, No. 7A, (Dec. 1984), pp. 3945–3946.

Lennig, M. and D. Sharp, "Unleashing the Potential of Human–To–Machine Communication", *Telesis,* No. 97, pp. 23–27, 1993.

Lennig, M., "Putting Speech Recognition to Work in the Telephone Network", *Computer,* (Aug. 1990), pp. 35–41.

Young, S., "Large Vocabulary Continuous Speech Recognition: a Review", *Proceedings, IEEE Automatic Speech Recognition Workshop,* (Dec. 10–13, 1995), pp. 3–28.

METHOD AND APPARATUS FOR SELECTING A VOCABULARY SUB-SET FROM A SPEECH RECOGNITION DICTIONARY FOR USE IN REAL TIME AUTOMATED DIRECTORY ASSISTANCE

FIELD OF THE INVENTION

This invention relates to a method and an apparatus for automatically performing desired actions in response to spoken requests. It is particularly applicable to a method and an apparatus for automatically providing desired information in response to spoken requests, as may be used to partially or fully automate telephone directory assistance functions.

BACKGROUND OF THE INVENTION

In addition to providing printed telephone directories, telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle a very large number of directory assistance calls per year, the associated labor costs are very significant. Consequently, telephone companies and telephone equipment manufacturers have devoted considerable effort to the development of systems which reduce the labor costs associated with providing directory assistance services.

One difficulty associated with the automation of directory assistance services is the requirement to process in real time databases including a very large number of orthographies. In essence, two factors limit the real-time performance of a speech recognition system, namely memory and processor throughput. Due to increased memory capabilities in the speech recognition hardware, the memory constraints is never reached. In rare cases, where indeed the memory capacity is exhausted, it is possible to increase that capacity at a relatively low cost. Therefore, the real limiting factor in a real-time speech recognition system is processor throughput. Given the maximum processor throughput achievable, it is possible to compute the maximum sized vocabulary that can be processed. Presently, a typical machine can process a recognition acoustic graph consisting of 130,000 nodes.

The benefit of a speech recognition vocabulary is usually measured in terms of savings in operator working time. Indeed, if a single orthography in the vocabulary can save a few seconds of operator's time daily, this entry is highly desirable in the vocabulary since it yields net productivity gain. Take the example of a restaurant listing "The Red Ship" in a given locality. If this listing is requested often by callers, its inclusion in the vocabulary is highly desirable because it frees operator's time as the recognition process and release of the telephone number to the caller is effected without any human intervention. On the other hand, the vocabulary also contains orthographies which are confusing and often lead to low recognition probabilities. Those entries in the vocabulary are not very beneficial since they lead to situations that must be resolved with the assistance of the human operator. Thus, the processing time invested in attempting to automatically process the request is wasted since ultimately the operator has to be involved.

Against this background it becomes apparent that there is a need in the industry to develop a method and an apparatus that is capable of effecting a vocabulary selection to derive a sub-set of a large speech recognition dictionary that improves the process of directory assistance.

OBJECTS AND STATEMENT OF THE INVENTION

An object of the present invention is to provide a method and an apparatus for selecting a vocabulary sub-set from a large speech recognition dictionary to allow an automated directory assistance system to operate in real time given certain hardware limitations, such as memory capacity and processor throughput.

Another object of the invention is to provide a method for enhancing the real-time operation of an automated directory assistance system.

A further object of the invention is to provide a machine readable medium containing a program element to instruct a computer for generating a vocabulary sub-set from a speech recognition dictionary.

As embodied and broadly described herein, the invention provides a process for generating a vocabulary sub-set from a speech recognition dictionary for use in an automated directory assistance system, the speech recognition dictionary including a plurality of orthographies, said process including the steps of:

computing for at least a group of orthographies of the speech recognition dictionary a benefit value for each orthography of the group;

ranking the orthographies in said group on a basis of decreasing benefit value; and selecting N orthographies from said group that have a highest benefit value to form said vocabulary sub-set, N being less that the total number of orthographies in said group and the value of N being selected to allow an automated directory assistance system to operate in real time with said vocabulary sub-set.

For the purpose of this specification the expression "benefit value" associated with a certain orthography is an indication of how much time a human operator will save due to the presence of the orthography in the vocabulary sub-set. In other words, "benefit value" captures the effect of a particular orthography in the vocabulary sub-set on the work load of the operator. As an example, if an orthography fully automates a certain business listing so the telephone number of that listing can be released without any human operator intervention, the "benefit value" associated with the business listing will be indicative of the savings in operator working time resulting from the automation. The "benefit value" could be expressed in absolute terms, such as in seconds of operator working time. Alternatively, the "benefit value" could be a relative measure used to rank orthographies in groups in terms of operator time saving ability. In a preferred embodiment "benefit value" includes two main components, namely an a probability value indicative of the likelihood of correct automation and an estimated operator working time for the particular orthography.

In a most preferred embodiment of the invention, the vocabulary selection problem is considered essentially as an optimization procedure that can be solved by applying a cost/benefit analysis. Each orthography of the speech recognition dictionary is processed to determine an incremental benefit in terms of operator's saving time. The orthographies are then ranked in terms of benefit, and only the most beneficial ones are selected. The actual number of selected orthographies depends on the overall cost ceiling, which as discussed earlier is determined essentially by the processor throughput. Thus, the faster the processor, the larger the number of the orthographies the vocabulary sub-set can have.

In the most preferred embodiment the incremental benefit of including an orthography in the vocabulary sub-set is computed by using the following equation:

$$\text{Benefit} = p(sr1)\, p(r1)\, p(l1)\, p(n1)\, E(wt)$$

where:
- $p(sr1)$ is the probability that the orthography will be chosen as top choice by the speech recognizer;
- $p(r1)$ is the probability of acceptance by the rejection layer of the automated directory assistance system;
- $p(l1)$ is the probability that the orthography is successfully linked to a desired listing;
- $p(n1)$ is the probability of successful navigation, given a set of valid links;
- $E(wt)$ is the mean working time value The product $p(sr1)p(r1)p(l1)p(n1)$ is indicative of the likelihood of correct automation, in other words, the ability of the system to release the telephone number associated by a given orthography without human intervention.

An automated directory assistance system is typically constituted of a number of functional layers, namely:
a) prompt layer;
b) speech recognition layer;
c) rejection layer;
d) link layer;
e) navigation layer When the caller request assistance he is prompted to provide listing information. If valid speech is detected, then the speech recognition layer is invoked and the top choice orthography is output with rejection parameters. The value $p(sr1)$ is the probability that the speech recognizer generates a correct top choice. This is established primarily on the basis of an a priori associated with the orthography. The $p(r1)$ is the probability that the orthography is considered as valid choice.

The value $p(r1)$ may, in practice be difficult to compute because rejection parameters, that directly influence $p(r1)$ vary in dependence upon the orthography items in the list output by the speech recognizer. Thus, if a list is generated where the two top orthography choices are phonetically similar, to the point of being confusing, the rejection parameters will indicate that the top orthography item is not likely to be a correct choice. In a different list output by the speech recognizer, containing the same top choice orthography, but where the second orthography entry is phonetically well distinguishable with the top entry, the rejection parameters will be different, indicating that the top entry is likely to be a correct choice. In a most preferred embodiment of the invention, the value $p(r1)$ is set as a constant for all the orthography entries.

The rejection layer processes the rejection parameters, using typically an acoustic graph and decides to "accept" or "reject" the token. If rejected, the call is directed to a human operator. If the token is accepted, the links affiliated with the top choice orthography are fetched. The value $p(l1)$ determines the probability of correct linking to the telephone number that the caller seeks. This value captures the impact of having multiple linkages to an orthography. Consider the example of the orthography "Joe's place" which may lead to a large number of listing structures in a specific locality. For example, there maybe a "Joe's place" restaurant, a "Joe's place" coffee shop, a "Joe's place" service station, etc. This orthography should be penalized because it may contribute to false automation due to the large number of links. Thus, the value of $p(l1)$ that is assigned to the orthography should be low.

Finally, the caption set navigator is invoked to direct the caller into navigating onto the intended listing. If the caption set includes a single choice, a simple confirmation "Yes/No" is requested from the user. If the "yes" is detected the telephone number is released and the transaction is completed. More complex navigation sets, such as department store that includes several departments are penalized because the likelihood of error is increased. Thus, the value $p(n1)$ is lower for more complex caption sets.

As embodied and broadly described herein the invention further provides a process for enhancing the real-time operation of an automated directory assistance system utilizing a speech recognition dictionary, the speech recognition dictionary including a plurality of orthographies, said process including the steps of:

computing for each orthography of the speech recognition dictionary a benefit value for each orthography of the group;

ranking the orthographies of the speech recognition dictionary on a basis of decreasing benefit value; and selecting N orthographies from said speech recognition dictionary that have a highest benefit value to form said vocabulary sub-set, N being less that the total number of orthographies in said group and the value of N being selected to allow the automated directory assistance system to operate in real time with said vocabulary sub-set;

operating the automated directory assistance system only with said vocabulary sub-set.

As embodied and broadly described herein the invention also provides an apparatus for generating a vocabulary sub-set from a speech recognition dictionary for use in an automated directory assistance system, the speech recognition dictionary including a plurality of orthographies, said apparatus comprising:

first memory means containing at least a group of orthographies of the speech recognition dictionary;

a processor in operative relationship with said first memory means;

a program element providing means for:
a) direct said processor for computing a benefit value for each orthography of the group;
b) ranking the orthographies in said group on a basis of decreasing benefit value; and
c) selecting N orthographies from said group that have a highest benefit value to form said vocabulary sub-set, N being less that the total number of orthographies in said group and the value of N being selected to allow an automated directory assistance system to operate in real time with said vocabulary sub-set.

As embodied and broadly described herein the invention yet provides a machine readable medium containing a program element for instructing a computer for generating a vocabulary sub-set from a speech recognition dictionary for use in an automated directory assistance system, the speech recognition dictionary including a plurality of orthographies, said computer including:

first memory means containing at least a group of orthographies of the speech recognition dictionary;

a processor in operative relationship with said first memory means;

said program element providing means for:
a) directing said processor for computing a benefit value for each orthography of the group;

b) ranking the orthographies in said group on a basis of decreasing benefit value; and c) selecting N orthographies from said group that have a highest benefit value to form said vocabulary sub-set, N being less that the total number of orthographies in said group and the value of N being selected to allow an automated directory assistance system to operate in real time with said vocabulary sub-set.

DESCRIPTION OF A PREFERRED EMBODIMENT

As an introductory comment it should be pointed out that the invention does not directly relate to the structure and operation of an automated directory assistance system, nor to the process for building the speech recognition dictionary from raw data, such as the white pages supplied by the telephone company. Rather, the invention is concerned with a method and apparatus for creating a sub-set of the speech recognition dictionary, that can be used in an automated directory assistance system to deliver real time performance. As background information, however, a description of the automated directory assistance system along with the process for generating the speech recognition dictionary will be provided to facilitate the understanding of the invention.

Figure 1:
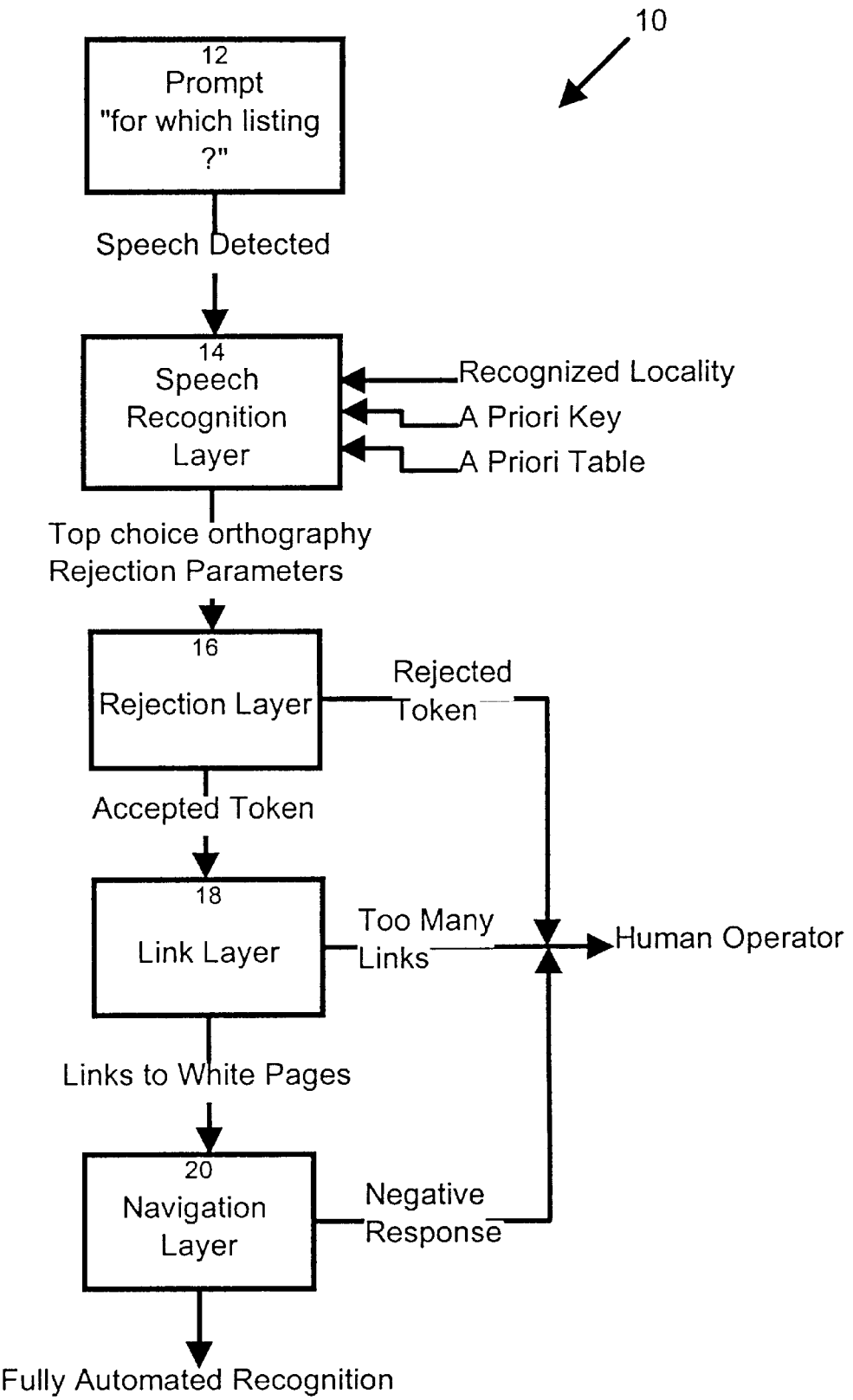
FIG. 1 is a functional block diagram illustrating the operation of an automated directory assistance system.

From a functional point of view, an automated directory assistance system includes several layers. This is best shown at FIG. 1 of the drawings. The system 10 includes a prompt layer 12 that prompts the user to provide listing information, such as the locality in which the business or individual whose phone number is requested are located. If valid speech is detected, the speech recognition layer 14 is invoked. The speech recognition layer tries to match the detected vocal tract signal with entries made in a speech recognition dictionary and selects the entry (hereinafter called "orthography") that is the most likely to be what the caller is saying. This is accomplished by using a fast match algorithm which computes a rough likelihood for all the phrases in the speech recognition dictionary and then ranks the top choices. All the top orthographies are then rescored using more precise likelihood and the top choice orthography is output along with rejection parameters that determine the likelihood of the top choice orthography being actually a correct selection. One rejection parameter is the phonetical similitude between the top choice orthography and the orthography holding the second rank. If the two orthographies are phonetically close, the rejection parameter will be indicative of a less than ideal probability of correct answer. On the other hand, if the orthographies are phonetically apart, the rejection parameters will point to a high probability of correct answer.

The top choice orthography and the rejection parameters are output to the rejection layer 16 that processes the rejection parameters and determines if the choice should be accepted or rejected. In essence, if the probability of the top choice being a correct answer exceeds a certain threshold the top choice orthography is accepted. Otherwise, it is rejected. The rejected token is then directed to a human operator that will process the request. For more information on the rejection method the reader may refer to the U.S. Pat. No. 5,097,509 assigned to Northern Telecom Ltd. issued on Mar. 17, 1992. The contents of this documents are incorporated herein by reference.

If the top choice orthography is accepted, the links affiliated with this top choice are fetched by the link layer 18. The link(s) is directed to the corresponding entry in the white pages of the telephone company that provide the telephone number corresponding to the entity or business that the caller seeks. For example, if the top choice orthography is "Nichols, Jim" a link is established with the entry corresponding to this name in the white pages. In many instances, particularly where a business name is being looked at, several links may be established. Take for example the name "Bill's" which may point to a restaurant "Bill's" or to a bar or a service station of the same name. In such case, several links will be established with all the "Bill's" entries in the white pages. To resolve the situation, the caller will be asked to indicate which entry he seeks. If too many links exist, that makes the resolution non-practical, the call is directed to the human operator. For businesses, that include several entries in the white pages, say "The Small Rocket Company" that has offices at three locations, the navigation layer 20 is invoked. The navigation layer directs the caller along the caption set by listing the various entries and asking the caller to indicate which one he seeks. As a final confirmation, the caller is asked a simple "yes/no" question to confirm if the choice is the correct one. In the case of a negative response, the call is again directed to a human operator. On the other hand, if the response is affirmative, the telephone number of the entity that the caller seeks is released and the transaction is completed.

For more information on the structure and detailed operation of an automated directory assistance system the reader may refer to the following documents.

| U.S. patents | |
| --- | --- |
| U.S. Pat. No. | Inventor |
| 5,488,652 | Gregory, J. Bielby et al. |
| 4,164,025 | Dubnowski et al. |
| 4,751,737 | Gerson et al. |
| 4,797,910 | Daudelin |
| 4,959,855 | Daudelin |
| 4,979,206 | Padden et al. |
| 5,050,215 | Nishimura |
| 5,052,038 | Shepard |
| 5,091,947 | Ariyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,695 | Green |

-continued

| U.S. patients | |
|---|---|
| U.S. Pat. No. | Inventor |
| 5,307,444 | Tsuboka |
| 5,086,479 | Takenaga et al. |

The speech recognition dictionary required for the operation of the automated directory assistance system is created from raw data supplied by the telephone company. Typically, this data is the white pages associated with a statistical source to generate (1) a lexicon representing the most frequently requested listings observed, (2) an action map for each orthography and (3) probabilities for each white page listing. The generated lexicon and associated a priori probabilities are required for speech recognition. The action map and the listing probabilities are required for caption set navigation.

The speech recognition dictionary builder consists of three stages, namely an a priori builder, a vocabulary builder and a vocabulary post processor. In short, the a priori builder cumulates listing statistics, recognized locality statistics and calling npanxx statistics required by the application. The vocabulary builder applies heuristics to the white pages to generate orthographies. Finally, the vocabulary post processor groups equivalent orthographies, generates the action map and phonemically transcribes the generated vocabulary.

As well, listing statistics are integrated into the speech recognition a priori table.

The raw data input to the speech recognition dictionary builder is, as mentioned earlier, an electronic version of the white pages along with a statistical source of call records. The electronic white pages provides detailed listing information, analogous to the printed version of the white pages. A sample listing is given below:

| MICROWAVE ANALYSIS INSTITUTE OF COLORADO | |
|---|---|
| Office Locations | |
| 5800, E, Eldridge, Av, DENVER | 3036220396 |
| 6169, S, Beacon, Wy, LITTLETON | 3032883963 |
| 8402,, Galbraith,, WESTMINSTER | 3030579821 |
| 200, W, Country Line, Rd, HIGHLANDS RANCH | 3034492001 |
| 2020,, Wadsworth, Blvd, LAKEWOOD | 3039924286 |
| Business Office, 5800, E, Eldridge, Av, DENVER | 3036221423 |
| Analysis Lab, 5800, E, Eldridge, Av, DENVER | 3036221251 |
| Day Or Night Call, DENVER | 3036224455 |

The electronic representation of this sample listing is given below:

```
<LISTSTRUCT
<ENTRY
<ID 33330><RANK 0><NMSUR "MICROWAVE ANALYSIS INSTITUTE OF COLORADO'>
<FULLCOM "DENVER AREA'>
>
<ENTRY
<ID 33331><RANK 1><NMSUR "OFFICE LOCATIONS">
>
<ENTRY
<ID 33332><RANK 2><TELNO "3036220396">
<BLDNO"5800"><STRPRE "E"><STR "ELDRIDGE"><STRTYP"AV"><FULLCOM "DENVER">
>
<ENTRY
<ID 33333><RANK 2><TELNO "3032883963">
<BLDNO"6169"><STRPRE "S"><STR "BEACON"><STRTYP"WY">
FULLCOM "LITTLETON">
>
<ENTRY
<ID 33334><RANK 2><TELNO "3030579821">
<BLDNO "8402"><STR "GALBRAITH"><FULLCOM "WESTMINSTER">
>
<ENTRY
<ID 33335><RANK 2><TELNO "3034492001">
<BLDNO "200"><STRPRE "W"><STR "COUNTRY LINE"><STRTYP "RD">
<FULLCOM "HIGHLANDS RANCH">
>
<ENTRY
<ID 33336><RANK 2><TELNO "3039924286">
<BLDNO "2020"><STR "WADSWORTH-><STRTYP "BLVD"><FULLCOM "LAKEWOOD">
>
<ENTRY
<ID 33337><RANK 1><TELNO "3036221423">
<NMSUR "BUSINESS OFFICE"><BLDNO "5800"><STRPRE "E'><STR "ELDRIDGE'>
<STRTYP "AV"><FULLCOM "DENVER">
>
<ENTRY
<ID 33338><RANK 1><TELNO "3036221251">
<NMSUR "ANALYSIS LAB">
<BLDNO "5800"><STRPRE "E"><STR "ELDRIDGE"><STRTYP "AV"><FULLCOM "DENVER">
>
<ENTRY
<ID 33339><RANK 1><TELNO "3036224455">
<NMSUR "DAY OR NIGHT CALL'><FULLCOM "DENVER">
<
```

The inventory of keywords is given in the following table

| Field | Meaning | Example |
| --- | --- | --- |
| <NSTL val> | non-standard telephone number | <NSTEL foreign> |
| <NMSUR val> | surname field | <NMSUR kubrick> |
| <NMSUB val> | subsequent name field | <NMSUB stanley> |
| <TITLE val> | professional title | <TITLE doctor> |
| <LINEAGE val> | lineage assigned to name | <LINEAGE jr.> |
| <HONOR val> | license, academic degrees | <HONOR PhD> |
| <BUSDSG val> | business description | <BUSDSC master plumber> |
| <HOUSE val> | description of house/bldg | |
| <BLDNO val> | building number | <BLDNO 16> |
| <BLDPRE val> | building number prefix | <BLDPRE N12-> |
| <BLDPOST val> | building number postfix | <BLDPOST -A> |
| <STR val> | street name | <STR armand bombardier> |
| <STRPRE val62 | street directional prefix | <STRPRE north> |
| <STRTYP val> | street thoroughfare type | <STRTYP boulevard> |
| <STRPOST val> | street directional postfix | <STRPOST east> |
| <FULLCOM val> | community | <FULLCOM saint lambert> |
| <STATE val> | state or province | <STATE texas> |
| <EXCH val> | international telephone exchange | |
| <COUNTY val> | county | <COUNTY monteregie> |
| > | end of entry delimiter | > |

Figure 2:
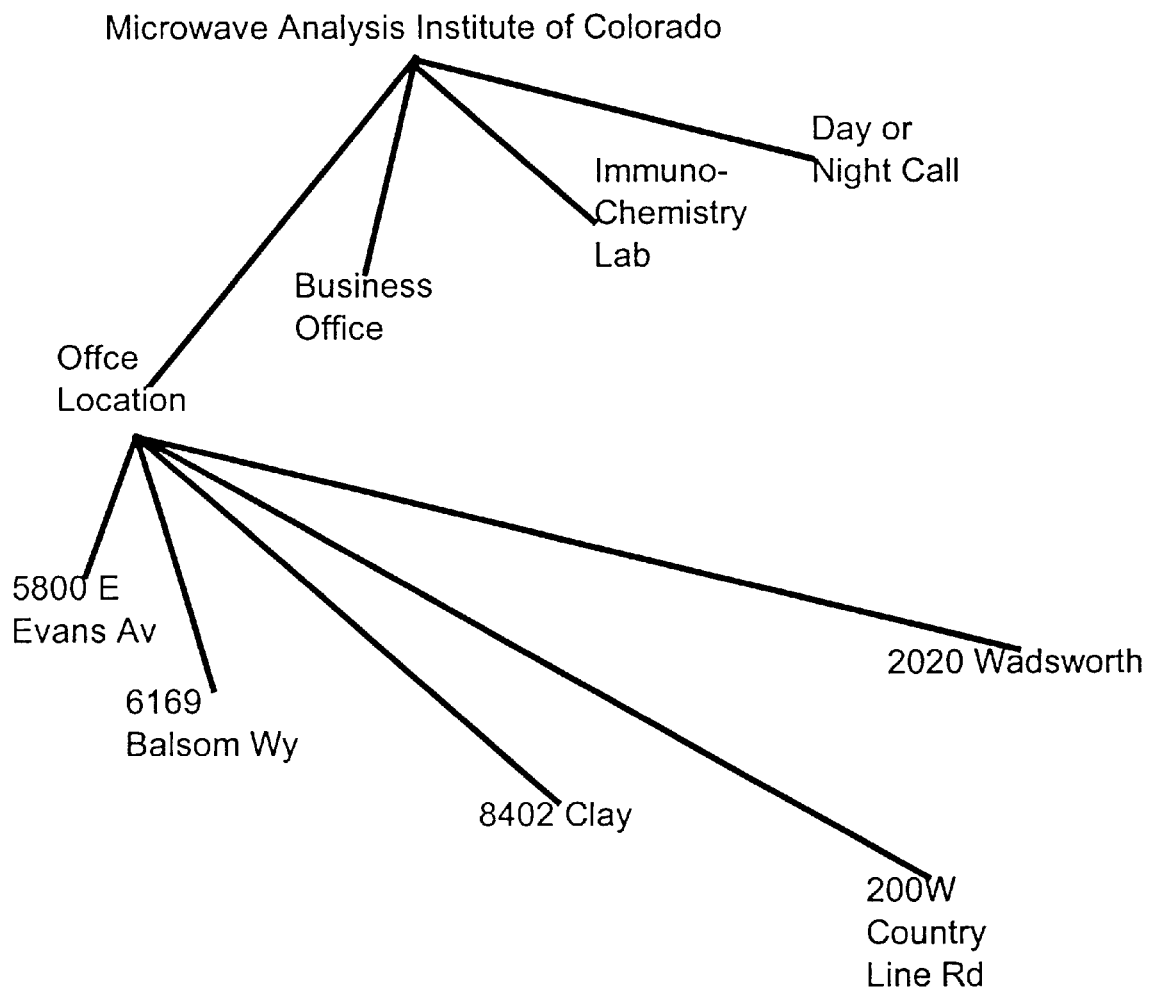
FIG. 2 illustrates graphically a typical caption set for a business listing in the white pages.

Each white pages caption set can be represented as a "tree" structure, as shown in FIG. 2: the top-line listing is the root of the tree, and the sub-listings are nodes of the tree. The structure embedded in the white pages caption set specifies the topology of the caption set tree.

Statistics regarding directory assistance call frequencies are necessary for speech recognition and for caption set navigation. In speech recognition, the statistics are used to bias the classifier toward lexical entries with higher probability of occurrence. In caption set navigation, statistics are used to determine navigation prompts.

A PRIORI BUILDER

The a priori builder derives from a set of call record supplied by the telephone company the following statistical information:

1) called npanxx statistics
2) locality statistics
3) caption and listing statistics
4) listing probabilities (conditioned on locality)

The called npanxx is the npanxx of the customer using the utomated directory assistance service. For example, if the customer's phone number is 303-465-2946, the calling npanxx is 303-465. Calling npanxx statistics are accumulated by polling a large number of call records. The called npanxx is the npanxx of the number being sought. For example, if the number released by the operator/system is 303-654-6492, the called npanxx is 303-654.

Locality is the city name specified by the caller in response to the question "for which city"? For example, if the caller specifies "Montreal", the "Montreal" statistic is incremented.

Caption statistics capture the total number of times a caption set is requested. Listing statistics capture the total number of times the listing is requested. Each call record provides a link to the white pages, and this link usually provides sufficient information to unambiguously determine the precise white pages listing. For example, if the link is "Microwave Analysis Institute of Colorado, Analysis lab" will correspond to the listing with record id=33338. In some cases, this link may provide multiple white pages listings, in which case each listing is considered. In some cases, the link to the white pages will not be associated with any white pages listing. This may occur when the white pages change, i.e. due to listings being deleted (the business is no longer listed), or when listing structures change (the business has added or deleted listing information, or the business has renamed departments).

Listing probabilities are also conditioned on the locality specified by the caller. This conditional probability is used later by the vocabulary selector and the caption set navigator. These processes also require the probability of npanxx given unrecognized locality is also computed.

VOCABULARY BUILDER

This section describes methods of building the speech recognition lexicon. The lexicon is later phonemically transcribed, mapped into a set of acoustic models, and a speech recognition dictionary is created. Each lexical item, or phrase, attempts to n mic the manner in which directory assistance queries are make. Phrases are generated using heuristics. More specifically, heuristics generate recognition phrases using the text contained in the electronic white pages. However, before processing the white pages entries with heuristics to create the speech recognition lexicon, the white pages data is pre-processed which corresponds to a "cleaning operation", involving the expansion of abbreviations, the resolution of mangled telephone numbers, and the removal of non-productive information.

Abbreviations are expanded in the following fields {Examples in braces}

"NMSUR"-----surname field{"agcy", "agency"}
"TITLE"-----title field{"atty","attorney"}
"STRPE"---street prefix field{"S", "south"}
"STRPOST"---street suffix field{"W", "west"}
"STR"--------street field{"17", "seventeenth"}
"FULLCOM"---locality field{"BOULDR", "boulder"}

Mangled telephone numbers (i.e. phone numbers with 7 instead of 10 digits) are corrected: "676-6656" becomes "514-676-6656"

Extraneous or non-productive information is deleted or adjusted:

"Toll free call" is deleted
trailing "the", "a", "of" are deleted
initial "XYZ" is deleted
"day or night" is deleted
"24-hour service" is deleted The heuristics used to generate the orthographies of the speech recognition lexicon may vary with the intended application. For example, the heuristics for business listings can be as follows:

First two words in "Rank 0" name field
Full "Rank 0" name field
Full "Rank 0" name field and full "Rank 1" name field
Full "Rank 0" name field and full "Rank 1" street name
Full "Rank 0" name field and "Rank 1" street name less street thoroughfare type information etc.

For example, consider the following caption set:

<LISTSTRUCT
ID 28724>
<ENTRY dD 28724><RANK 0>
<NMSUR "FIRST AMERICAN SHIP BUILDING COMPANY">
>
<ENTRY <ID 28725><RANK 1>
<NMSUR "ACCTG & PERSONNEL">
<BLDNO "909"><STR "WADSWORTH"><STRTYP "BLVD">
>
<ENTRY <ID 28726><RANK 1>
<NMSUR "ARVADA OFFICE">

```
<BLDNO "4851"><STR "INDEPENDENCE">
>
<ENTRY <ID 28727><RANK 1>
<NMSUR "AURORA OFFICE">
<BLDNO "2851"><STRPRE "S"><STR "PARKER"><STRTYP "RD">
>
>
```

Application of the heuristics (described above) generates the following lexical items:
FIRST AMERICAN
FIRST AMERICAN SHIP BUILDING COMPANY
FIRST AMERICAN SHIP BUILDING COMPANY - ACCTG & PERSONNEL
FIRST AMERICAN SHIP BUILDING COMPANY - ARVADA OFFICE
FIRST AMERICAN SHIP BUILDING COMPANY - AURORA OFFICE
FIRST AMERICAN SHIP BUILDING COMPANY on WADSWORTH BLVD
FIRST AMERICAN SHIP BUILDING COMPANY on WADSWORTH etc.

Listings with title information are treated with different heuristics. The title field in the white pages entry is used to store information relating to the profession of the person specified in the "NMSUR" and "NMSUB." fields. Titles include orthopedic surgeons, judges, attorneys, senators, doctors, and dentists. Titles are interpreted using a substitution table. For example, the title "MD OB-GYN & INFERTILITY" is interpreted as "Doctor". A common variant of the usage of title information has been observed: the title can occur in the final position of the phrase. For example, phrase initial title "Dr." becomes phrase final "MD", and phrase initial title "Attorney" becomes phrase final "Attorney at Law". As an example, the following heuristics may be applied to titled listings:
TITLE+NMSUB+NMSUR
TITLE+NMSUR
NMSUB+NMSUR
NMSUR
NMSUB+NMSUR+TITLE For example, the listing "<NMSUR Trine><NMSUB William A><TITLE Atty>" will generate the following orthographies:
Attorney William A Trine
Attorney Trine
William A Trine
Trine
William A Trine, Attorney at Law

VOCABULARY POST PROCESSOR

The vocabulary post processor effects the following tasks:
1) link generation;
3) phonemic transcription;
4) a priori table building A link is defined as an association between an orthography and a listing in the white pages. Each orthography in the speech recognition dictionary has one or more links to entries(listing(s)) in the white pages. The output of the speech recognizer 14 (top choice orthography) determines the action to be taken by the directory assistance process. These actions may include invoke confirmation, invoke caption set navigator, token-rejected revert to human operator. Heuristically generated phrases are linked to the listing of origin. For example, the orthography "Montreal Post Office" is linked to the entry "Canada/Government/Postal Service/Montreal Post Office".

A dictionary access program is invoked to generate a "phonemic" transcription for each orthography. A phonemic transcription is an expressive representation of the sound patterns of a phrase using a set of 41 phoneme symbols (1 symbol for each distinct sound in the English language). This phonemic transcription is transformed into articulatory transcriptions(surface forms), which capture special articulatory phenomena that depend on the context of a phoneme. Then, an acoustic transcription is generated, indicating which acoustic model (represented as a concise mathematical model) should be used during speech recognition.

The a priori table is build by associating to each orthography an a priori vector. The individual a priori vectors are established on the basis of the statistical information generated by the a priori builder, discussed earlier, namely called npanxx statistics, locality statistics, caption and listing statistics and listing probabilities. For example, an orthography associated with a rare request will be penalized more than an orthography associated with a request that occurs more often.

It is important to appreciate that during the operation of the system a resolution between two or more orthographies selected as likely candidates is made primarily on the basis of a probability value established for each orthography candidate. That probability value is determined from the a priori table. The probability value is not a constant number strictly associated with a respective orthography. Rather, it is dynamically computed as the caller answers the prompts generated by the system. The following example will illustrate this point. A caller requests "AutoPerformers Store" located in "Montreal". The system determines that three "AutoPerformers Store" exist in the Montreal region, one in "Montreal-West", one in "Montreal-East" and one "Montreal-North". This determination provides three possible orthographies as likely candidates. One possible way of making a resolution is to inspect npanxx caller statistics. The statistics in the a priori table show that individuals from the particular npanxx region to which the caller belongs are more likely to request the "AutoPerformers Store" from "Montreal-West" rather than the businesses in the other Montreal locations. Accordingly, the "AutoPerformers Store" in "Montreal-West" is given a higher probability and comes out as the top choice orthography.

A large number of strategies are possible in processing the statistical data provided in the a priori table to select top choice orthographies. Those strategies would usually be determined by the intended application and may be made dependent or involve parameters such as time of day, season or some type of social events. For example, businesses specializing in repairing heating systems may be based favorably during the winter season or pizza outlets given a higher probability value during sporting events where individuals are more likely to request delivery of a meal at home.

OUTPUT FILES

The files that are output by the vocabulary post processor include in essence a dictionary including a set of orthography entries and action maps. The main dictionary is composed of a set of orthography entries. Each orthography entry is composed of a set of orthography groups. Each orthography group is composed of a set of orthographies and each orthography has a transcription.

An example dictionary entry "Lenscraft" is given below

```
<ID <ENTRY 194>
    <ORTHO_GROUP <ENTRY 4456>
    <ORTHO <ENTRY 4668><NAME "LENSCRAFT">
    <TRAN <NAME 11E0n0z-k0r8a2f1-t0R0z0><STRESS1-2-0>>>>
    <ORTHO_GROUP <ENTRY 4457>
    <ORTHO <ENTRY4669><NAME "LENSCRAFT IN THE WESTMINSTER
    MALL">
    <TRAN <NAME 11E0n0z0-k0r8a2f1-t0R0z0__I1n0__D0*0__w0E0s2t0-
    mI13=n2*0=s2t0R0__m1A213><STRESS 1-2-0-0-0-2-1-0-0-1>>>
    <ORTHO <ENTRY 4670><NAME "LENSCRAFT IN WESTMINSTER
    MALL">
    <TRAN <NAME 11E0n0z0-k0r8a2f1-t0R0z0__I1n0__w0E0s2t0-
    m1I3=n2*0=s2t0R0__m1A213><STRESS 1-2-0-0-2-1-0-0-1>>>>
    <ORTHO_GROUP <ENTRY4458>
    <ORTHO<ENTRY 4671><NAME "LENSCRAFT AT VILLA ITALIA
    MALL">
    <TRAN<NAME 11E0n0z0-k0r8a2f1-t0R0z0__*0t1__v0I2-12*2__*0-t6h1a0=I2i1-
    *0__m1a2I3><STRESS 1-2-0-0-1-0-0-1-0-0-1>>>
```

An action map may consist of a series of orthography-link pairs. An example action mapping is the following:

```
<CONTINENTAL BREWERIES>
|<RANK=0><NAME=CONTINENTAL BREWERIES><ADDRESS=8769
SHERIDAN BLVD><CITY=WESTMINSTER>|
|<RANK=0><NAME=CONTINENTAL BREWERIES><ADDRESS=5801
LEETSDALE DR><CITY=DENVER>|
|<RANK=0><NAME=CONTINENTAL BREWERIES><ADDRESS=3193
WALNUT><CITY=BOULDER>|
|<RANK=0><NAME=CONTINENTAL BREWERIES><ADDRESS=355 S
HARLAN><CITY=LAKEWOOD>|
|<RANK=0><NAME=CONTINENTAL BREWERIES><ADDRESS=5066 S
WADSWORTH><CITY=LITTLETON>|
|<RANK=0><NAME=CONTINENTAL BREWERIES><ADDRESS=4619 S
MASON><CITY=FORT COLLINS>|
|<RANK=0><NAME=CONTINENTAL BREWERIES><ADDRESS=15231 E
MISSISSIPPI AV><CITY=AURORA>|
>
```

The first line is the orthography, in this case, "Continental Breweries". The next seven lines are links associated with this link. In this example, the business has several caption sets, each with a separate white page entry. An example of an action pointing to a "RANK 1" listing is given below.

```
<BUS INFORMATION
|<RANK=0><NAME=RTD-REGIONAL TRANSPORTATION DISTRICT><CITY=DENVER AREA>|<RANK=1> <NAME=ROUTE
AND SCHEDULE INFORMATION><CITY=DENVER>|
```

VOCABULARY SELECTION

For many applications, the speech recognition dictionary discussed earlier is too large to allow real time performance. This occurs particularly for heavily populated localities. To implement the automated directory assistance service in those areas it is often required to use only a sub-set of the main speech recognition dictionary. Vocabulary selection is the process of extracting a real-time subset from a non-real-time dictionary. The initial dictionary is input to the vocabulary selection algorithm, along with affiliated a priori tables and action mappings (link file). Conforming to the navigation policy, and obeying real-time constraints (such as maximum acoustic graph size), the vocabulary selector chooses a real-time subset. Note that vocabulary selection is applied once for each a priori key (locality).

Figure 3:
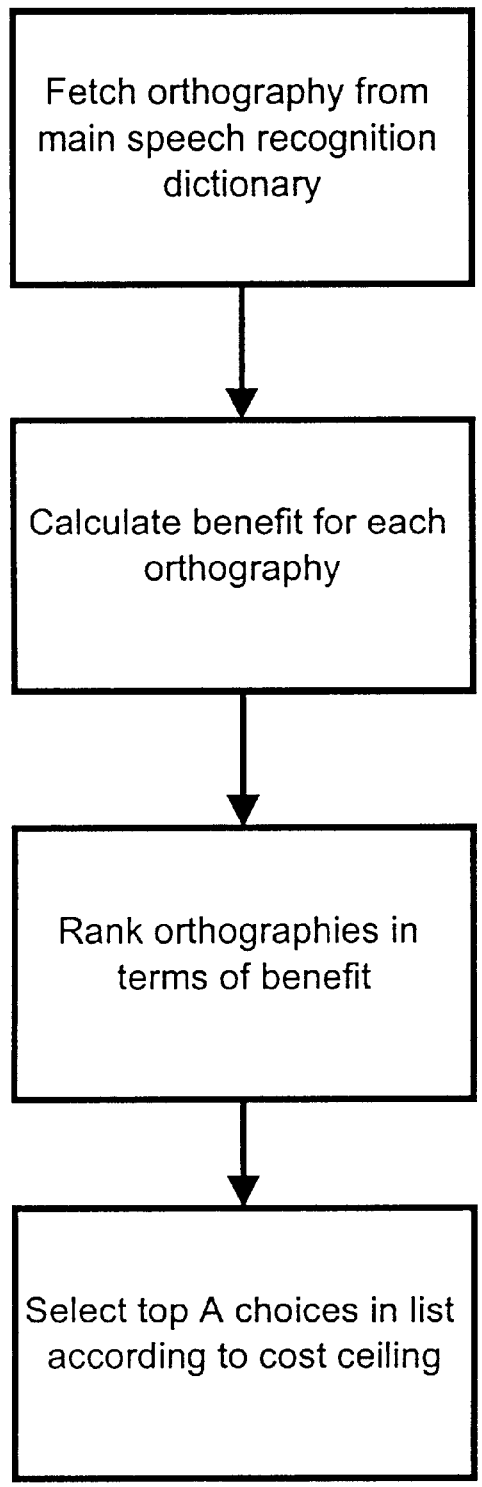
FIG. 3 is a flow chart illustrating the steps of the process for generating the real time vocabulary sub-set from the main speech recognition dictionary.

The vocabulary selection problem can be viewed as an optimization problem. Using a cost-benefit paradigm, a cost (penalty) and benefit are assigned to the dictionary subset. More specifically, each orthography of the main speech recognition dictionary is processed to determine an incremental benefit. The orthographies are then ranked in terms of benefit. Orthographies are added to the vocabulary sub-set, one at a time; until the cumulative cost exceeds the global maximum, e.g. the available acoustic graph is exhausted. The actual number of selected orthographies depends on the overall cost ceiling, which as discussed below is determined essentially by the processor throughput. Thus, the faster the processor, the larger the number of the orthographies the vocabulary sub-set can have. This process is illustrated by the flowchart at FIG. 3.

The cost of a speech recognition vocabulary is related to the two factors that limit real-time performance, namely 1) memory
2) speed (processor throughput)

Due to increased memory capabilities in the speech recognition hardware, the memory constraint is never reached. Therefore, the limiting factor in the real-time speech recognizer is processor throughput. Given the maximum processor throughput achievable, it is possible to compute the maximum sized speech recognition dictionary that can be processed. As an example, currently available equipment can process a dictionary including 130,000 nodes).

The benefit of a speech recognition vocabulary is usually measured in terms of end-to-end performance. This can be expressed in terms of savings in operator working time. The probability of automating a directory assistance query depends on the following sub-systems of the automated directory assistance system: the speech recognition layer (sr1), the rejection layer (r1), the link layer (l1), and the navigation layer (n1). In order to gauge the benefit of adding a lexical item to the speech recognition dictionary, the effect of each layer must be considered. The probability of navigation is then multiplied by the expected working time for this listing, yielding the incremental benefit of including a lexical item in the vocabulary.

The incremental benefit is measured in seconds per orthography, and is computed using $$\text{benefit} = p(sr1)\, p(r1)\, p(l1)\, p(n1)\, E(wt)$$

where p(sr1)=prob (ortho chosen as top choice by the speech recognizer)

p(r1)=prob (acceptance |ortho)

p(l1)=prob (ortho links to desired listing |accepted ortho)

p(n1)=prob (automating the desired listing |ortho link, accepted ortho)

E(wt)=mean working time for listing

Exact computation of the incremental benefit is rather difficult. However, a reasonable approximation can be made for each factor in the incremental benefit equation, as discussed below.

PROBABILITY THAT SPEECH RECOGNIZER GENERATES CORRECT TOP CHOICE, P(SRL)

Initially, a uniform distribution is assumed, and each orthography is given an equal probability of being chosen as top choice. This probability is penalized by a probability value that reflects the likelihood of requesting the orthography. In other words, orthographies that are requested often (locations whose telephone numbers are requested often) are assigned a higher probability than less popular locations. This data can be computed from statistical information generated by examining a large number of actual call records. For example, if during the past six months the restaurant "Woushy-Woo" has been requested often, say ten times a day it will be assigned a high probability value. On the other hand the law firm "Bill's & Bill's" requested twice a week will be assigned a lower probability value. To further refine p(sr1) it may be envisaged to apply a correction factor to accommodate a priori knowledge of the source of the orthography. For example, each orthography may be tagged by the method used to generate the orthography. Associated with each tag is a weight determined using the heuristic evaluation mechanism. Since this mechanism influences the likelihood of correct speech recognition, this factor if taken into account further refines the value p(sr1). In a specific example, if two different heuristic mechanisms are being used to generate the orthographies of the speech recognition dictionary, one mechanism being more accurate than the other, the p(sr1) value obtained solely from the a priori can be multiplied by a numerical value which reflects the distinction in terms of recognition accuracy between the two heuristic mechanisms.

PROBABILITY OF TOKEN BEING ACCEPTED BY THE REJECTION LAYER

The probability of a token being accepted is set to the same value for all orthographies. As an example, an acceptance rate of 18% can be assumed. Thus, the probability of acceptance is set to a constant 0.18.

In principle, confusing orthographies should be assigned a lower probability since they have similar acoustic features (e.g. proximity in acoustic space) and are more likely to be rejected. However, it is difficult to determine in practice if lexical items are confusible, and a constant p(r1) value is a good compromise.

PROBABILITY OF LINKING TO INTENDED CAPTION SET

The probability of linking to intended caption set given a recognized orthography, p(l1), captures the impact of having multiple linkages to an orthography. Orthographies with a large number of links tend to contribute to false automation and should be penalized. For example, the orthography "Rocky Mountain" is a synonym for 50+ listing structures in the Colorado white pages. This orthography should be heavily penalized. Care must be taken to ensure that orthographies that have a large number of links to the same listing structure, such as "Post Office" are not penalized, e.g., do not penalize semantically equivalent listings or semantically similar listings.

One measure for p(l1) is link fan out. If an orthography has 2 links, then set p(l1)=0.5; if an orthography has 1 link, then p(l1)=1, etc.

Another measure for p(l1) is to consider the variability of the resulting actions as measured through the link entropy. For example, if link 1 leads to 95 listings, and link 2 leads to 5 listings, then 1.0−H(l1)=0.82, whereas if each leads to 50 listings, then 1.0−H(l1)=0.32.

PROBABILITY OF SUCCESSFUL NAVIGATION

The probability of successful navigation must now be determined given a set of links.

For the purposes of vocabulary selection, a simplified version of the caption set navigation advisor has been implemented. If an orthography has only one link (e.g. mapping to the white pages), then the caller confirms on this link. If an orthography has multiple links, then the caller is asked a multiple choice question in order to choose a single link. Note that the number of parts to the multiple choice question is generally limited by telephone company policies, e.g., Bell Quebec requires no more than three parts to a multiple-choice question. If more than three choices exist at a particular junction, then the caller is given the option of responding "other", and the caption set navigation defaults to the operator. Having selected or confirmed on a single link, the associated caption set must be navigated. If the caption set consists of only a single listing, then the dialog ends. If there is more than one listing, then the caller is asked a second question in order to select the intended listing. This process continues until a terminal listing is encountered.

It is clear that many factors contribute to the success or failure of caption set navigation. Orthographies leading to many links create ambiguity, which decreases the probability of success. Complex caption sets or caption sets with many layers are more difficult to navigate. If the caption set has a wide fan-out, say M branches, and the policy is to limit a multiple-choice prompt to N parts, then M-N listings in the speech recognition dictionary are excluded from consideration.

Other factors that limit navigation are related to the performance of the speech recognizer and the probability of false intent by the caller (e.g. responded "yes" but real intent was "no").

Figure 4:
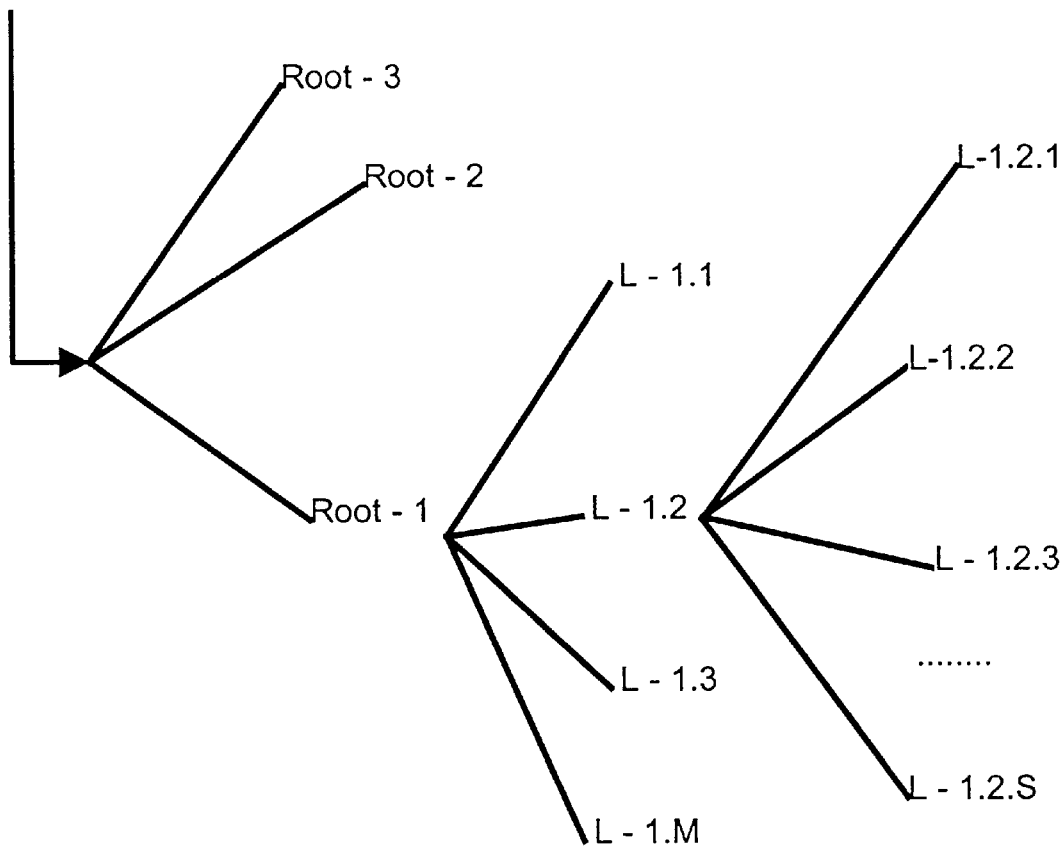
FIG. 4 illustrates graphically the tree structure of a multi-layered caption set in a speech recognition dictionary, used for calculating the value p(n1)

These factors are captured in a "navigation policy" which may include the following parameters relating to navigation and speech recognition performance:

1) maximum listing fan-out (how many parts to a multiple-choice question)
2) number of questions
3) probability of false intent
4) rejection threshold
5) probability of correct recognition for yes/no question
6) probability of correct recognition for N-part multiple choice question The product p(11)P(n1) can be determined by using the following formula:

$$P_{sr}(Nquestions)P_{ci}(Nquestions) \sum_{i=1}^{NRoots} P(Navigation \setminus Rt(i))$$

Where $P_{sr}$ (N question) is the probability of successful speech recognition to an N part multiple-choice question. Typically such probability value is relatively high. For a two part question a probability value of 0.98 may be used, while on a five part question a probability value of 0.96 would be typical. The value $P_{ci}$(N questions) is the probability of correct intent (the caller saying what he/she indeed wanted to say) for example answering "yes" when the intention was to say "yes". In some remote occurrences the caller can provide the wrong answer, for example "marketing" when he/she meant "main office". $P_{ci}$(N questions) takes into account those situations. Typically a high value can be assigned to $P_{ci}$(N questions), such as 0.9. The value P(Navigation|Rt(i)) is the probability of successful navigation from the secondary levels of the caption set. Take the example of the caption set illustrated at FIG. 4. The root level has 3 entries (N=3), with $P_{sr}$(N questions) and $P_{ci}$(N questions) being given the values of 0.97 and 0.9, respectively. For N=2 and N=3, PA(Navigation|Rt(i)) has the value of 1.0 since the those entries do not fan out. This leaves P(Navigation|Rt(l)) to be calculated. This probability value can be expressed by the following formula $$P_{sr}(Mquestions)P_{ci}(Mquestions) \sum_{j=1}^{M} P(Navigation \setminus layerL(j))$$

Where $P_{sr}$(M question) is the probability of successful speech recognition of M questions and $P_{ci}$(M questions) is the probability of correct intent for M questions. For M=1,2 and 3 the value P(Navigationllayer L(j)) is 1.0 since those entries do not fan out. This leaves P(Navigation|layer L(j)) for j=4 to be determined. To do so, one must now move to the last level (level with S entries) of the caption set. P(Navigation|layer L(4)) is equal to the product of $P_{sr}$(K questions) and $P_{ci}$(M questions).

ESTIMATED OPERATOR WORKING TIME

The estimated operator working time can be calculated from call records. A sample of 17,500 calls was used to extract the mean working times, given the complexity of the listing structures. Complexity is measured by how far removed a listing is from the caption set header. For example, the listing "|PENNEY LANE|DEPARTMENT STORES|AURORA MALL| 200 E ANDROMEDA AV|" is assigned a complexity of four.

Average operator working times are given in the following table. For computation of incremental benefit, the average listing complexity is computed and the average working time is extracted from the table.

| Complexity | Number of tokens | Average working time (seconds) |
|---|---|---|
| 1 | 7052 | 15.6 |
| 2 | 6078 | 19.7 |
| 3 | 2183 | 21.0 |
| 4 | 1621 | 20.0 |
| 5 | 556 | 21.6 |
| 6 | 70 | 24.2 |
| 7 | 18 | 23.3 |
| average | 17,578 | 22.4 |

Figure 5:
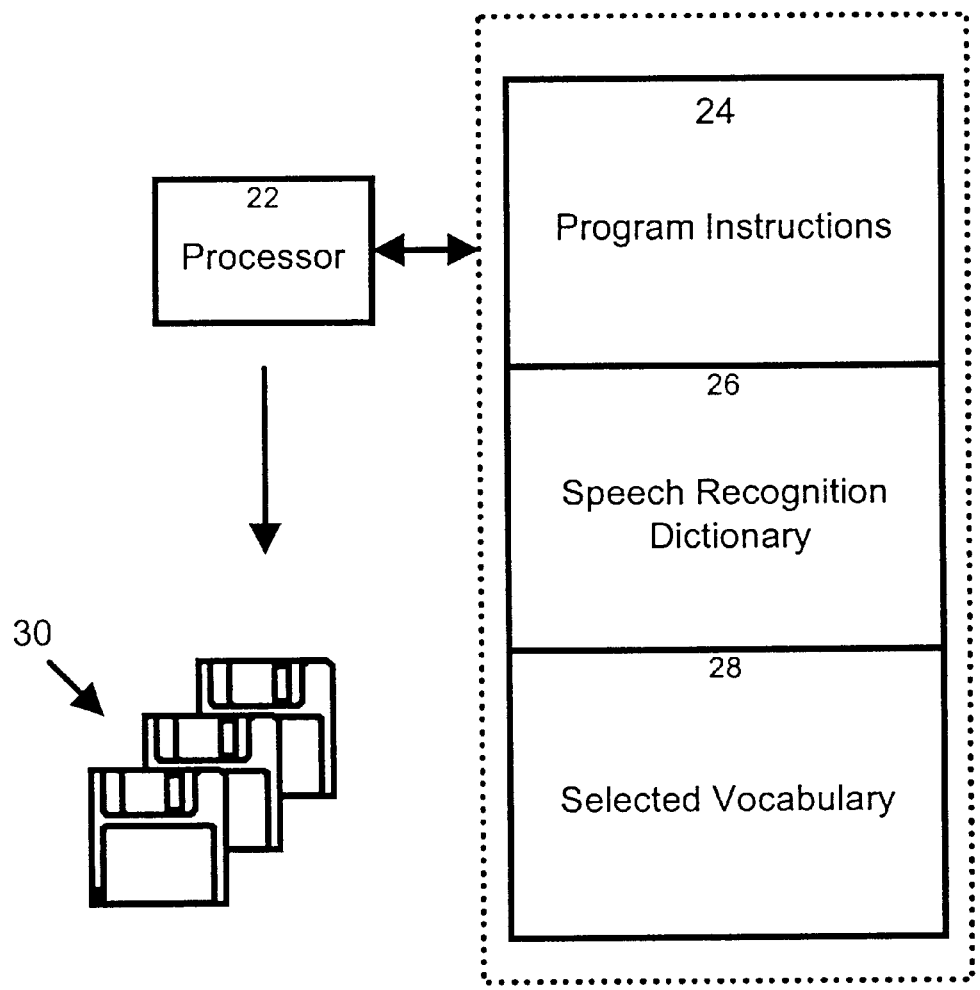
FIG. 5 is a functional block diagram of an apparatus for generating the vocabulary sub-set allowing real time performance from a speech recognition dictionary.

The apparatus used for generating the vocabulary sub-set from the speech recognition dictionary is illustrated as a block diagram at FIG. 5. A processor 22 executes instructions stored in a segment 24 of a memory. The instructions direct the processor to perform the operations illustrated at FIG. 3 of the drawings. More specifically, the program calculates the benefit associated with each orthography and then ranks the orthographies in terms of decreasing benefit value. Given the maximum number of orthographies A that can be taken to form the real-time vocabulary sub-set as dictated by the specific application, only those top A choices are selected. The source data, i.e. the speech recognition dictionary is loaded in a segment 26 of the memory, while the selected orthographies forming the real-time vocabulary sub-set are loaded in the section 28 of the memory. After the operation is completed, the real-time vocabulary sub-set can be stored on a mass storage device 30.

The above description of a preferred embodiment should not be interpreted in any limiting manner since variations and refinements can be made without departing from the spirit of the invention. The scope of the invention is defined in the appended claims and their equivalents.

We claim:

1. A process for generating a vocabulary sub-set from a speech recognition dictionary suitable for use in an automated directory assistance system, said process being performed before the automated directory assistance system performs speech recognition with the vocabulary sub-set, said process including the steps of:

providing a speech recognition dictionary including a plurality of vocabulary items;

providing a plurality of call records;

matching said call records to vocabulary items in said speech recognition dictionary;

computing for a group of the vocabulary items in said speech recognition dictionary a linkage value for each vocabulary item in the group, said linkage value being indicative of the probability of successful linkage of the vocabulary item to a desired listing containing telephone number information by a link layer of an automated directory assistance system;

computing for a group of the vocabulary items in said speech recognition dictionary a frequency of occurrence for each vocabulary item in the group, said frequency of occurrence being computed at least in part on the basis of said call records;

computing for said group of vocabulary items in the speech recognition dictionary a benefit value for each vocabulary item of the group, said benefit value being computed at least in part on the basis of said linkage value and said frequency of occurrence;

ranking the vocabulary item in said group on a basis of benefit values;

selecting N vocabulary items from said group that have a highest benefit value to form said vocabulary sub-set, N being less that the total number of vocabulary items in said group;

storing said vocabulary sub-set on a computer readable medium suitable for use in the automated directory assistance system to perform speech recognition.

2. A process as described in claim 1, wherein value of N is selected to allow an automated directory assistance system to operate in real time with said vocabulary sub-set.

3. A process as defined in claim 1, wherein said benefit value associated with a certain vocabulary item is further function of a probability of said certain vocabular item being chosen as a top choice candidate by a speech recognizer layer of the automated directory assistance system.

4. A process as defined in claim 1, wherein said benefit value associated with a certain vocabulary item is further function of a probability of said certain vocabulary item being accepted by a rejection layer of the automated directory assistance system.

5. A process as defined in claim 1, wherein said linkage value is function of the number of links originating from the vocabulary item.

6. A process as defined in claim 1, wherein said benefit value associated with a certain vocabulary item is further function of a probability of successful navigation given a predetermined set of links associated with said certain vocabulary item.

7. A process as defined in claim 1, wherein said benefit value associated with a certain vocabulary item is further function of an estimated working time of a human operator to release to a caller a telephone number.

8. A process as defined in claim 1, wherein said benefit value associated with a certain vocabulary item is further function of a probability of correct automation associated with said certain vocabulary item.

9. A process for enhancing a real-time operation of an automated directory assistance system, said process being performed before the automated directory assistance system performs speech recognition said process including the steps of:
provlding a speech recognition dictionary including a plurality of vocabulary items;
providing a plurality of call records;
matching said call records to vocabular items in said speech recognition dictionary;
computing for a group of the vocabulary items in said speech recognition dictionary a linkage value for each vocabulary items in the group, said linkage value being indicative of the probability of successful linkage of the vocabulary item to a desired listing containing telephone number information by a link layer of an automated directory assistance system;
computing for a group of the vocabulary items in said speech recognition dictionary a frequency of occurrence for each vocabulary item in the group, said frequency of occurrence being computed at least in part on the basis of said call records;
computing for at least a group of vocabulary items in the speech recognition dictionary a benefit value for each vocabulary item of the group, said benefit value being computed at least in part on the basis of said linkage value and said frequency of occurrence;
ranking the vocabulary items of the speech recognition dictionary on a basis of benefit value;
selecting N vocabulary items from said speech recognition dictionary that have a highest benefit value to form said vocabulary sub-set, N being less that the total number of vocabulary items in said group;
operating the automated directory assistance system to perform speech recognition with said vocabulary sub-set.

10. A process as described in claim 9, wherein the value of N is selected to allow an automated directory assistance system to operate in real time with said vocabulary sub-set.

11. A process as defined in claim 9, wherein said benefit value associated with a certain vocabulary item is further function of a probability of said certain vocabulary item being chosen as a top choice candidate by a speech recognizer layer of the automated directory assistance system.

12. A process as defined in claim 9, wherein said benefit value associated with a certain vocabulary item is further function of a probability of said certain vocabulary item being accepted by a rejection layer of the automated directory assistance system.

13. A process as defined in claim 9, wherein said linkage value is function of the number of links originating from the vocabulary item.

14. A process as defined in claim 9, wherein said benefit value associated with a certain vocabulary item is further function of a probability of successful navigation given a predetermined set of links associated with said certain vocabulary item.

15. A process as defined in claim 9, wherein said benefit value associated with a certain vocabulary item is further function of an estimated working time of a human operator to release to a caller a telephone number.

16. A process as defined in claim 9, wherein said benefit value associated with a certain vocabulary item is further function of a probability of correct automation associated with said certain vocabulary item.

17. An apparatus for generating a vocabulary sub-set from a speech recognition dictionary for use in an automated directory assistance system, the speech recognition dictionary including a plurality of vocabulary items, said vocabulary sub-set being generated before the automated directory assistance system performs speech recognition with the vocabulary sub-set, said apparatus comprising:
first memory means containing at least a group of vocabulary items of the speech recognition dictionary;
second memory means containing a plurality of call records;
a processor in operative relationship with said first memory means and said second memory means;
a program element providing means for:
a) matching said call records to vocabulary items in said speech recognition dictionary;
b) computing for a group of the vocabulary items in said speech recognition dictionary a linkage value for each vocabulary item in the group, said linkage value being indicative of the probability of successful linkage of the vocabulary item to a desired listing containing telephone number information by a link layer of an automated directory assistance system;
c) computing for a group of the vocabulary items in said speech recognition dictionary a frequency of occurrence for each vocabulary item in the group, said frequency of occurrence being computed at least in part on the basis of said call records;
d) directing said processor to compute a benefit value for each vocabulary item of the group, said benefit value being computed at least in part on the basis of said linkage value and said frequency of occurrence;
e) ranking the vocabulary items in said group on a basis of benefit value; and
f) selecting N vocabulary items from said group that have a highest benefit value to form said vocabulary sub-set, N being less that the total number of vocabulary items in said group.

18. An apparatus as defined in claim 17, wherein the value of N is selected to allow an automated directory assistance system to operate in real time with said vocabulary sub-set.

19. An apparatus as defined in claim 17, wherein said apparatus further comprises a third memory means for storing said N vocabulary items.

20. An apparatus as defined in claim 19, comprising means for transferring said N vocabulary items from said third memory means to mass storage.

21. An apparatus as defined in claim 17, wherein said benefit value associated with a certain vocabulary item is further function of a probability of said certain vocabulary item being chosen as a top choice candidate by a speech recognizer layer of the automated directory assistance system.

22. An apparatus as defined in claim 17, wherein said benefit value associated with a certain vocabulary item is further function of a probability of said certain vocabulary item being accepted by a rejection layer of the automated directory assistance system.

23. An apparatus as defined in claim 17, wherein said linkage value is function of the number of links originating from the vocabulary item.

24. An apparatus as defined in claim 17, wherein said benefit value associated with a certain vocabulary item is further function of a probability of successful navigation given a predetermined set of links associated with said certain vocabulary item.

25. An apparatus as defined in claim 17, wherein said benefit value associated with a certain vocabulary item is further function of an estimated working time of a human operator to release to a caller a telephone number.

26. An apparatus as defined in claim 17, wherein said benefit value associated with a certain vocabulary items is further function of a probability of correct automation associated with said certain vocabulary item.

27. A machine readable medium containing a program element for instructing a computer for generating a vocabulary sub-set from a speech recognition dictionary for use in an automated directory assistance system, the speech recognition dictionary including a plurality of vocabulary items, said vocabulary sub-set being generated before the automated directory assistance system performs speech recognition with the vocabulary sub-set, said computer including:

first memory means containing at least a group of vocabulary items of the speech recognition dictionary;

second memory means containing a plurality of call records;

a processor in operative relationship with said first memory means and said second memory means;

said program element providing means for:
 a) matching said call records to vocabulary items in said speech recognition dictionary;
 b) computing for a group of the vocabulary items in said speech recognition dictionary a linkage value for each vocabulary item in the group, said linkage value being indicative of the probability of successful linkage of the vocabulary item to a desired listing containing telephone number information by a link layer of an automated directory assistance system;
 c) computing for a group of the vocabulary items in said speech recognition dictionary a frequency of occurrence for each vocabulary item in the group, said frequency of occurrence being computed at least in part on the basis of said call records;
 d) directing said processor to compute a benefit value for each vocabulary item of the group, said benefit value being computed at least in part on the basis of said linkage value and said frequency of occurrence;
 e) ranking the vocabulary items in said group on a basis of benefit value; and
 f) selecting N vocabulary items from said group that have a highest benefit value to form said vocabulary sub-set, N being less that the total number of vocabulary items in said group.

28. A machine readable medium as defined in claim 27, wherein the value of N is selected to allow an automated directory assistance system to operate in real time with said vocabulary sub-set.

29. A machine readable medium as defined in claim 27, wherein said benefit value associated with a certain vocabulary item is further function of a probability of said certain vocabulary item being chosen as a top choice candidate by a speech recognizer layer of the automated directory assistance system.

30. A machine readable medium as defined in claim 27, wherein said benefit value associated with a certain vocabulary item is further function of a probability of said certain vocabulary item being accepted by a rejection layer of the automated directory assistance system.

31. A machine readable medium as defined in claim 27, wherein said linkage value is function of the number of link originating from the vocabulary item.

32. A machine readable medium as defined in claim 27, wherein said benefit value associated with a certain vocabulary item is further function of a probability of successful navigation given a predetermined set of links associated with said certain vocabulary item.

33. A machine readable medium as defined in claim 27, wherein said benefit value associated with a certain vocabulary item is further function of an estimated working time of a human operator to release to a caller a telephone number.

34. A machine readable medium as defined in claim 27, wherein said benefit value associated with a certain vocabulary item is further function of a probability of correct automation associated with said certain vocabulary item.

* * * * *